(12) United States Patent
Leite Netto et al.

(10) Patent No.: US 11,481,766 B2
(45) Date of Patent: Oct. 25, 2022

(54) METHOD FOR PAYMENT AUTHORIZATION ON OFFLINE MOBILE DEVICES WITH IRREVERSIBILITY ASSURANCE

(71) Applicant: Matera Systems Inc., Philadelphia, PA (US)

(72) Inventors: Carlos Augusto Leite Netto, Alphaville (BR); Carlos André Branco Guimarães, Campinas (BR)

(73) Assignee: MATERA SYSTEMS, INC., Philadelphia, PA (US)

( * ) Notice: Subject to any disclaimer, the term of this patent is extended or adjusted under 35 U.S.C. 154(b) by 1145 days.

(21) Appl. No.: 15/283,840

(22) Filed: Oct. 3, 2016

(65) Prior Publication Data
US 2018/0096348 A1 Apr. 5, 2018

(51) Int. Cl.
G06Q 20/38 (2012.01)
G06Q 20/32 (2012.01)
G06Q 20/40 (2012.01)

(52) U.S. Cl.
CPC ....... *G06Q 20/3829* (2013.01); *G06Q 20/322* (2013.01); *G06Q 20/401* (2013.01); *G06Q 20/40145* (2013.01)

(58) Field of Classification Search
CPC ............. G06Q 20/3829; G06Q 20/322; G06Q 20/401; G06Q 20/40145
(Continued)

(56) References Cited

U.S. PATENT DOCUMENTS

| | | | |
|---|---|---|---|
| 8,769,304 B2 * | 7/2014 | Kirsch | G06Q 20/0855 380/30 |
| 10,049,349 B1 * | 8/2018 | Grassadonia | G06Q 20/40 |

(Continued)

FOREIGN PATENT DOCUMENTS

| | | |
|---|---|---|
| BR | P11014196 | 9/2011 |
| BR | 10 2013 0334316 | 12/2013 |

(Continued)

OTHER PUBLICATIONS

Public Key Infrastructure, Lopez, 2007.*
(Continued)

*Primary Examiner* — Michael I Ezewoko
(74) *Attorney, Agent, or Firm* — B. Aaron Schulman, Esq.; Stites & Harbison, PLLC

(57) ABSTRACT

A methods for payment authorization (10) on mobile devices (DM) such as smartphones, tablets or any others available, which may be offline; the method for payment authorization (10) comprises the compilation of sequential steps of method (M1) of the payer (20) with method (M2) of the operational system (50) or application that constitutes a logical structure for alignment with the method (M3) of the payee (30), resulting in authenticated payment (PG) of financial transactions (TF) with assurance of "non-repudiation" through generation of a private key (51) and public key (52), as well as association of positive identification (21a) and personal identification (21b) of the payer (PG) with the mobile device (DM); said methods (M1), (M2) and (M3) are executed on mobile devices (DM) with enough processing capacity for execution of encryption algorithms and which may be used for issuing payment orders (PG), on-site or otherwise, carried out with financial resources (RF) or credit limits (LC) such as bonuses, points, products, tickets, etc. of the payer (20) of the device (DM).

5 Claims, 11 Drawing Sheets

(58) Field of Classification Search
USPC .................................................. 705/7, 71
See application file for complete search history.

(56) References Cited

U.S. PATENT DOCUMENTS

| | | | |
|---|---|---|---|
| 10,373,169 B2 * | 8/2019 | Todasco | G06Q 20/4097 |
| 10,846,694 B2 * | 11/2020 | Wong | H04L 9/3236 |
| 10,861,009 B2 * | 12/2020 | Lakshmanan | G06Q 20/3829 |
| 2009/0171682 A1 | 7/2009 | Dixon et al. | |
| 2015/0006386 A1 | 1/2015 | Tebbe | |
| 2015/0310431 A1 * | 10/2015 | Lakshmanan | G06Q 20/02 |
| | | | 705/71 |

FOREIGN PATENT DOCUMENTS

| | | |
|---|---|---|
| CN | 105590194 | 12/2014 |
| KR | 20150142913 | 12/2015 |

OTHER PUBLICATIONS

Basili, 2014, IEEE.*
Park, 2014.*
Shetty, 2014.*

\* cited by examiner

METHOD FOR PAYMENT AUTHORIZATION ON OFFLINE MOBILE DEVICES WITH IRREVERSIBILITY ASSURANCE

TECHNICAL FIELD OF THE INVENTION

This invention patent relates to a method for payment authorization on offline mobile devices with irreversibility or "non-repudiation" assurance, a method which was particularly developed for authentication of payments transactions carried out by the consumer/payer that uses mobile devices such as smartphones, tablets or other devices available with enough processing capacity to execute encryption algorithms and which may be used for on-site payment authorizations, or otherwise, using financial resources or credit limits of the holder of said mobile device. Said method for payment authorization, based on the combination of various encryption techniques and digital signature for generation of a digital representation capable of enabling that the financial transaction is performed without the requirement that the holder's device is connected to the Internet or to other devices, while ensuring the authenticity of the payer's data, from the amount to be paid and other additional information.

BACKGROUND OF THE INVENTION

It is known that mobile devices such as smartphones, tablets and others perform various computational tasks like data encryption, which is part of technology solutions for miscellaneous financial transactions, making a quick and secure alternative to carry out payments or financial transactions.

Among the current market solutions, there are applications that enable electronic data processing for generation of encoded elements, such as bar codes, QR (Quick Response) Codes or others on the product or on the screen of the payee's equipment, allowing the payer to use the camera of his/her mobile device to "read" and recognize said encoded element as to complete the financial transfer through the application.

In order to provide full security for the financial transaction, some applications, before concluding the purchase, request input of a security code, in other words, a PIN (Personal Identification Number) with 4 digits, or use of the ID (Identity) feature through digital touch on the mobile device in order to authorize a payment.

Another financial transaction solution through mobile devices are applications that enable payment through proximity of the receiving equipment with the mobile device through technologies such as Near Field Communication (NFC).

To perform said financial transaction through the NFC technology, the mobile device must be provided with a NFC chip, with a security component that keeps financial information stored locally through encryption and/or sends encrypted financial information to the vendor's device; to confirm the transaction, the user, after determining the amount to be transferred, must bring the mobile device close to the receiving device and, afterwards, inform the security code—PIN—to authorize the transaction.

What happens is that said financial transaction solution through Near Field Communication technology—NFC—depends, exclusively, of the presence of a NFC chip on the mobile device, as well as said technology embedded in the receiving device, in other words, point-of-sale (POS) terminals, limiting usage of this resource for financial transactions to those in possession of a smartphone with such technology.

Another technological solution for performing financial transactions through mobile devices is the Magnetic Secure Transmission—MST—, which allows purchases in establishments that accept credit or debit cards as payment methods, establishments provided with receiving terminals that are compatible with this payment method. To perform the financial transaction, the payee inputs the amount on the terminal and the payer unlocks the mobile device, also choosing the card to be used for payment and using his/her fingerprint for authentication. Said Magnetic Secure Transmission (MST) technology generates variable magnetic fields for a short period of time and the signal received by the terminal emulates the same magnetic field alteration than a magnetic stripe sliding over the scanning head.

Security levels of the Magnetic Secure Transmission (MST) technology consist in biometric authentication, token generation and protection system embedded to the mobile device.

Despite solutions available enabling financial transactions through mobile devices, said solutions are necessarily dependable of connectivity, in other words, online connection of the mobile device of the payer, such as 3G/4G, Bluetooth and NFC, which, in turn, are subject to various unforeseen events which may impair the practical use of the solution, such as mobile data network infrastructure issues, mobile network limits—package minutes—established by telecommunication providers, delay in transaction confirmation, lack of connectivity on the payer's device, etc.

Thus, a lack of connectivity during the payment process may cause issues both to the payee and the payer, as well as embarrassment to the payer. Another inconvenience of said applications for electronic business through mobile devices lies in the fact that there is no assurance of authenticity or "non-refusal" or "non-repudiation" for protection between the parts of a transaction. As is known, "non-repudiation" or "non-refusal" is the assurance that the issuer of a message, or the person that electronically carried out a certain transaction, cannot deny taking part in the transaction afterwards, since digital signature of transaction data is only possible through techniques such as asymmetric encryption (public/private key) to avoid tampering during the transmission and storage process of the transaction information. This way, unless in case of improper use of the digital certificate, which is not exempt of liability, the perpetrator cannot deny performing the transaction. It is known that digital transactions are subjected to fraud when computer systems are improperly accessed or infected with Trojans or viruses. Thus, people taking part in transactions may potentially plead fraudulent action, tampering of transaction information such as amount, payee identification, etc. in order to reverse a transaction.

Similarly, these inconveniences are a very relevant barrier for large-scale adoption by the "payees", in other words, commercial establishments, restaurants, independent professionals, etc., and also for customer engagement, since payment transactions require a high degree of reliability.

Otherwise, other more trusted payment forms such as cash, credit and debit cards, albeit less convenient and/or higher transaction costs remain favored by purchasers and vendors.

ANALYSIS OF THE STATE OF THE ART

In a research on specialized databases, documents related to offline financial transactions were found, such as document No. BRPI1014196 (NOKIA), which relates to a method and device for providing offline payment transactions with data transfer. More particularly, it relates to a computer-readable storage means, carrying one or more sequences of one or more instructions that, once executed by one or more device processors, may perform a certain number of functions. The processors may perform the following steps: receive initiation of one or more parameters for offline payment, in which the parameters are related to a predetermined period of time; generate, based on said parameters, a public key and a private key that are valid for the predetermined period of time; and the transaction signature data are associated with the offline payment using the private key during the predetermined period of time.

Document No. CN105590194 (CHINA UNIONPAY) relates to an offline payment method based on a mobile terminal and comprises a user registration phase and a payment phase. On the user registration phase, registered user information and identification information are transferred to a payment server through a mobile terminal, the payment server designs a user ID to a user according to the registered user information and the corresponding relationship of the user registration information; the user ID and the identification information are created and stored in the payment server. On the payment phase, the vendor's POS equipment sends "to-be-paid" information and identification information acquired to the payment server. The mobile terminal sends the user ID to the payment server and the payment server checks if the user ID and identification information are compared to each other according to the corresponding stored relationship. "To-be-paid" information is sent to the mobile terminal after verification, and is submitted to a card issuing mechanism in order to authorize payment. Afterwards, the user receives the payment information sent by the mobile phone terminal.

Document No. KR20150142913 relates to an offline payment system and an offline payment system with the code, and, more specifically, comprises: (i) a terminal device for demonstration of a payment structure, if a store, discount method and payment method are selected, including a code generated by the store, or the discount and payment method; a storage device for scanning the code shown on the terminal and transmitting a payment request signal, to a service device, including the code number and payment information; and (ii) the store device for scanning the store code, user identification information, store discount method information, and payment information through analysis of the code number included in the payment request signal, authenticating user information and storage and execution information for the payment, based on discount method information and payment information.

Another document No. BR 10.2013.033431-6(VR) that relates to a system and method for establishing a transaction, integrated circuit card, and, payment terminal; this invention relates to financial transactions and, in particular, financial transactions that employ integrated circuit cards. In this scenario, this invention provides a virtual coiner that allows transactions between terminals and integrated circuit cards even when there is no communication between said terminal and an issuing card host. More specifically, a system is provided for establishing an offline transaction, comprising (i) an integrated circuit card from a user comprising at least one electronic accumulator for value storage, (ii) a payment terminal compatible with the integrated circuit card, comprising a SAM, in which control and authorization of the transaction is carried out by the SAM of the payment terminal, and the transaction amount is debited from an electronic accumulator of the integrated circuit card.

Another document No. US2009171682 relates to the processing of transactions in an offline environment for a pre-paid product that comprises a portable consumption device that responds to the presentation of the pre-paid product to a scanner for offline processing, starting the operation of the pre-paid product, receiving data from the pre-paid product to the scanner that indicates that the pre-paid product is associated to a pre-paid account balance, determining that the pre-paid product is in a negative balance status and, thus, taking preventive actions in response to the negative balance status, in order to prevent future acceptance of the pre-paid product through a scanner.

Another document No. US2015006386 relates to a token payment system for a mobile device. The authorization token allows the mobile device to generate a bar code. The system receives from a point of sale device, in connection with the bar code scanning, the authorization signal and related information to the purchased service or product. The system validates the authorization token, and compares information related to the product or service with information associated to a virtual payment account. In response to the comparison, the system allows or refuses the purchase. The system transmits the authorization or refusal to the point of sale device, and a purchase amount is applied to the virtual payment account.

This way, although the documents relate to financial transaction methods on offline systems, none of the known solutions simultaneously provide the possibility of payment in case the mobile device of the purchaser is offline (no internet access, no Bluetooth connections, NFC, etc.) and the assurance of "non-repudiation". The innovative mechanism described in this patent enables not only this kind of offline payment, but also ensures authenticity (non-repudiation), including from a legal viewpoint in countries that acknowledge digital signature mechanisms, of the payment transaction. It is provided, therefore, that the method applied herein ensure that the present patent addresses the legal patentability requisites.

BRIEF DESCRIPTION OF THE INVENTION

This invention patent relates to a method for payment authorization on offline mobile devices with irreversibility or "non-repudiation" or non-refusal assurance, authenticating payment transactions generated from mobile devices such as smartphones, tablets or other devices with sufficient processing capacity to execute encryption algorithms.

The object of this invention is to enable mobile devices used for payments to send payment information to the recipient using unidirectional data transfer, in other words, the recipient/payee sends this payment information to an authorization server that validates and performs the payment compensation process.

Said method may also be expanded to multiple payments in which the recipient may send instructions to the authorization server in order to split the payment with other recipients or perform various debit/credit transactions among different accounts during the payment compensation process.

The object of the invention consists of the server being capable of authorizing a payment order generated by the mobile device of the payer with no internet connectivity, Bluetooth, NFC, etc. between the payer and the authorization server, so that the payer may only provide a screen to show a bar code, a speaker for sound output or any other physical means to send a small amount of data to the sales equipment of the payee.

Said compensation process may be related to any form of payment, such as bonuses, points from reward programs, vouchers, products, tickets, etc., as the authorization can be used not only for payment orders, but also for other types of orders, such as purchase orders.

Said method for payment authorization shall provide digital signatures issued by the payer which will be accepted as a lawful alternative to sign documents in many countries, safeguarding not only the identity of the payer but also the contents of the transaction to be authorized.

Said digital signature consists of a full-time security feature in which the recipient or other third party that attempt to change the transaction data shall end up invalidating the signature and, consequently, the transaction itself (no authenticity).

The present method has contributed for optimization of implementation of encryption algorithms, digital signature and generation of digital code so that the computational processing requisites are compatible to the capacity of most current mobile devices.

As well as the optimization related to the implementation of the algorithms, the present method also contributes to the optimization of digital representing, in terms of the amount of bits needed to store all information of the payment order and which will be transmitted from the payer's device to the payee.

DESCRIPTION OF THE INVENTION

Figure 1:
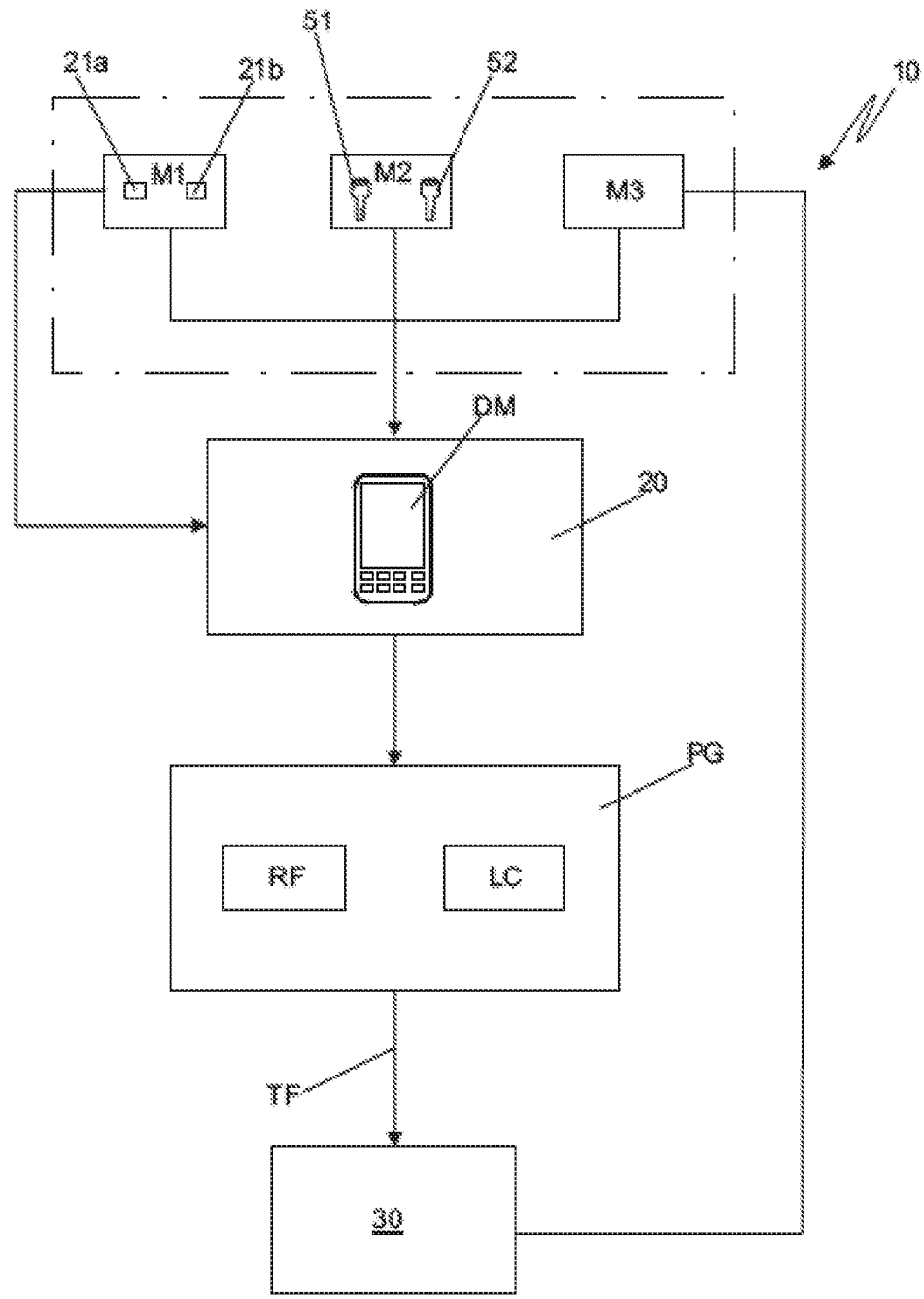
FIG. 1 shows a diagram of the method assembly of the payer, system and payee that constitutes offline payment.
Figure 1A:
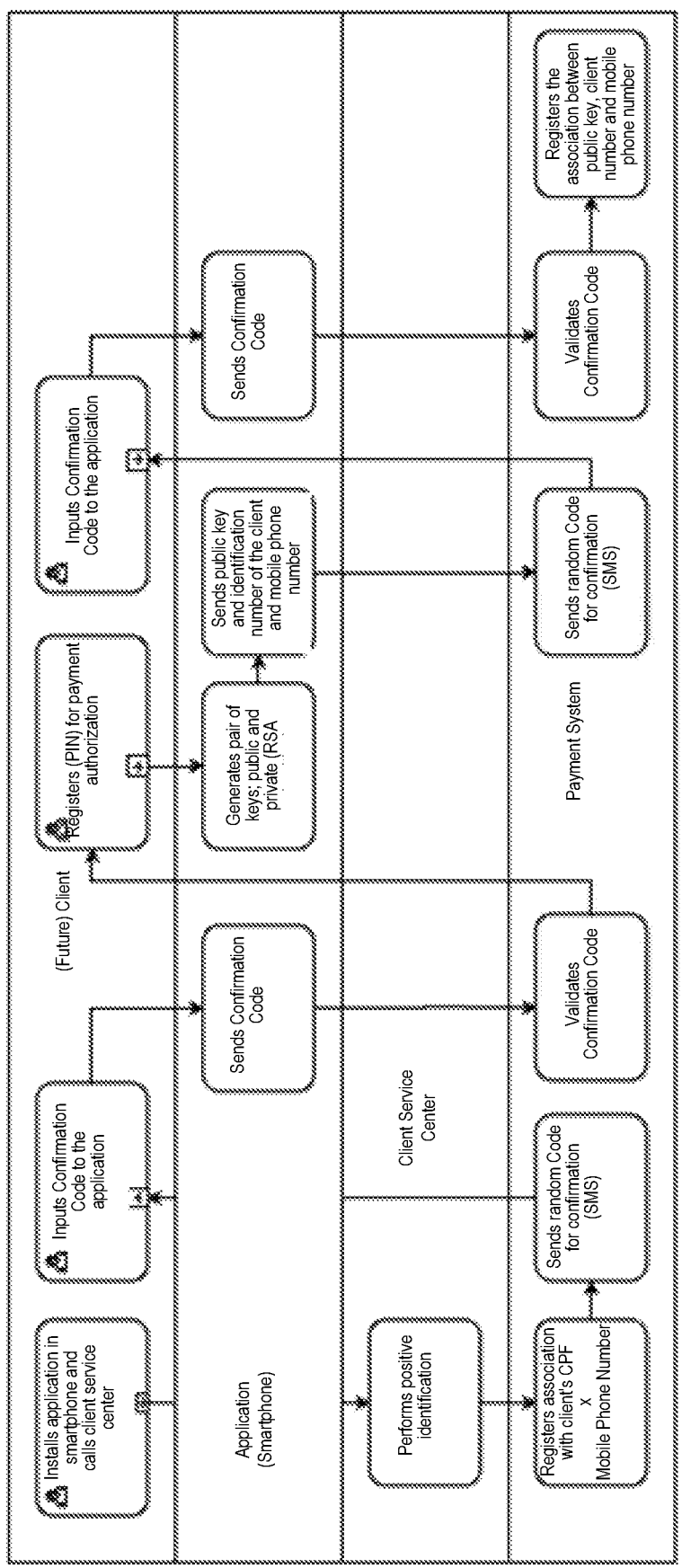
FIG. 1A shows a flowchart providing a general overview of exemplary methods M1 and M2 described herein.
Figure 1B:
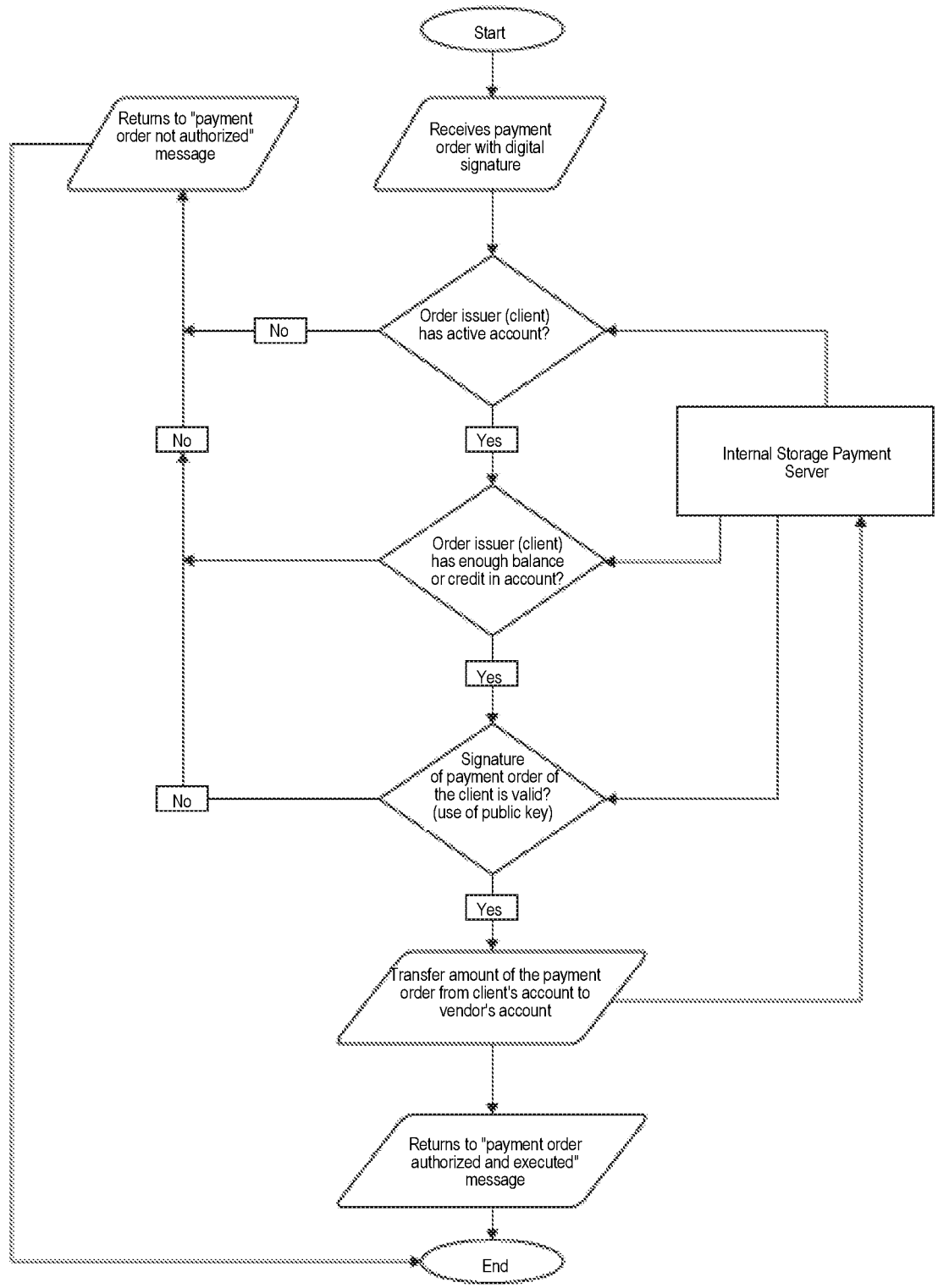
FIG. 1B shows the optimized flowchart of the authorization phase of the payment order.
Figure 1C:
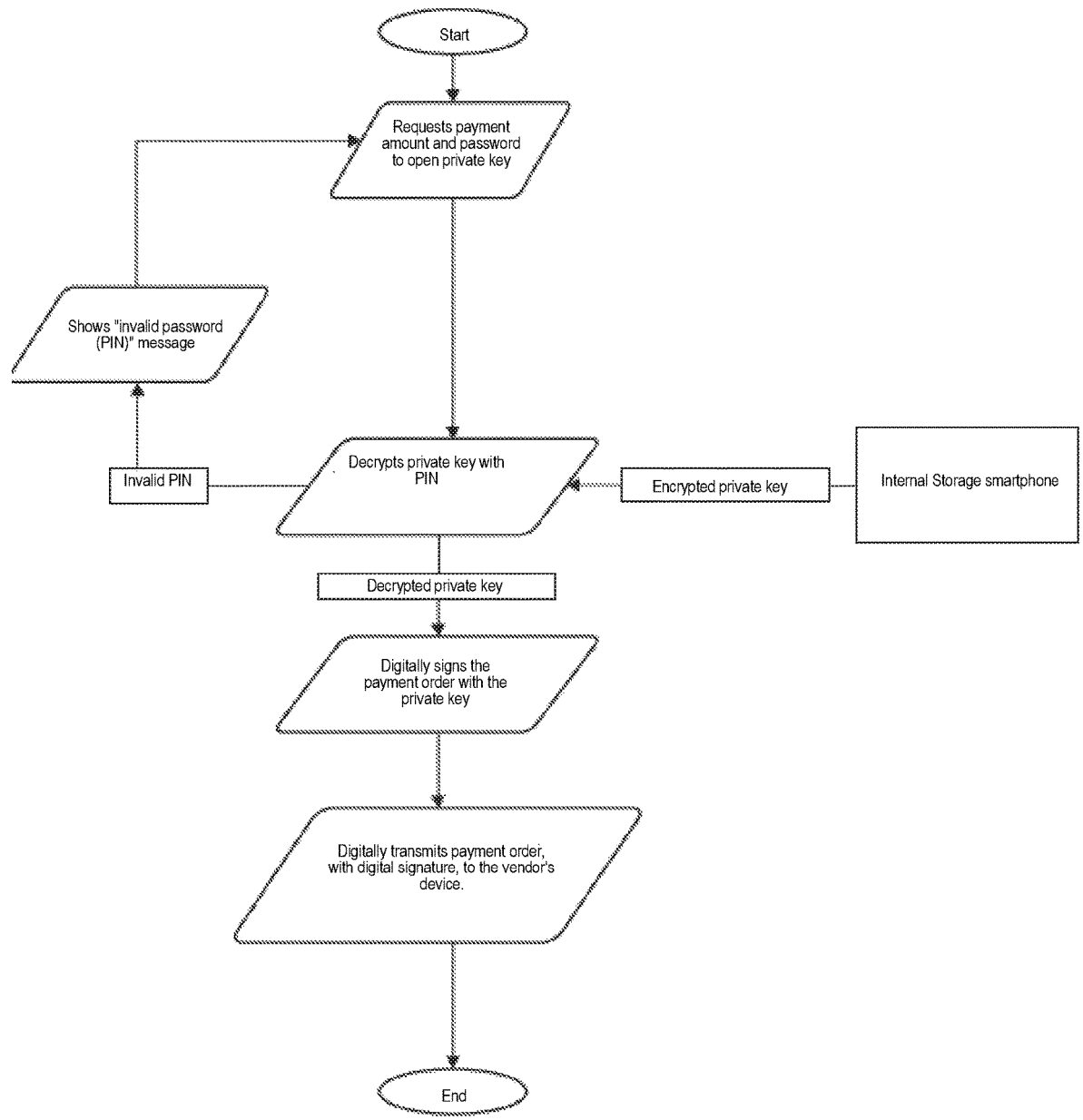
FIG. 1C shows the payment order generation flowchart.
Figure 2:
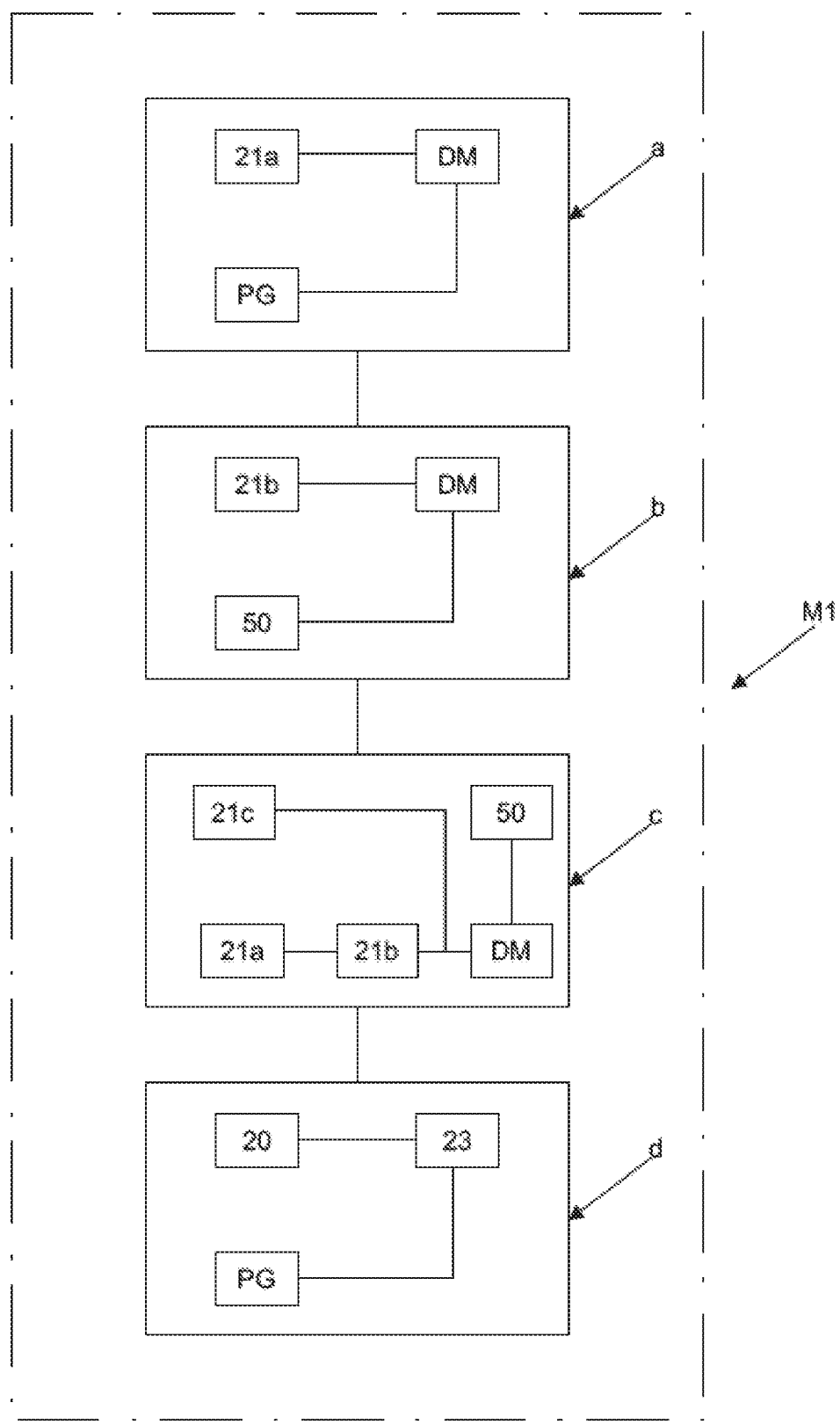
FIG. 2 represents a block diagram of the logical sequence of the exemplary payer method M1.
Figure 3:
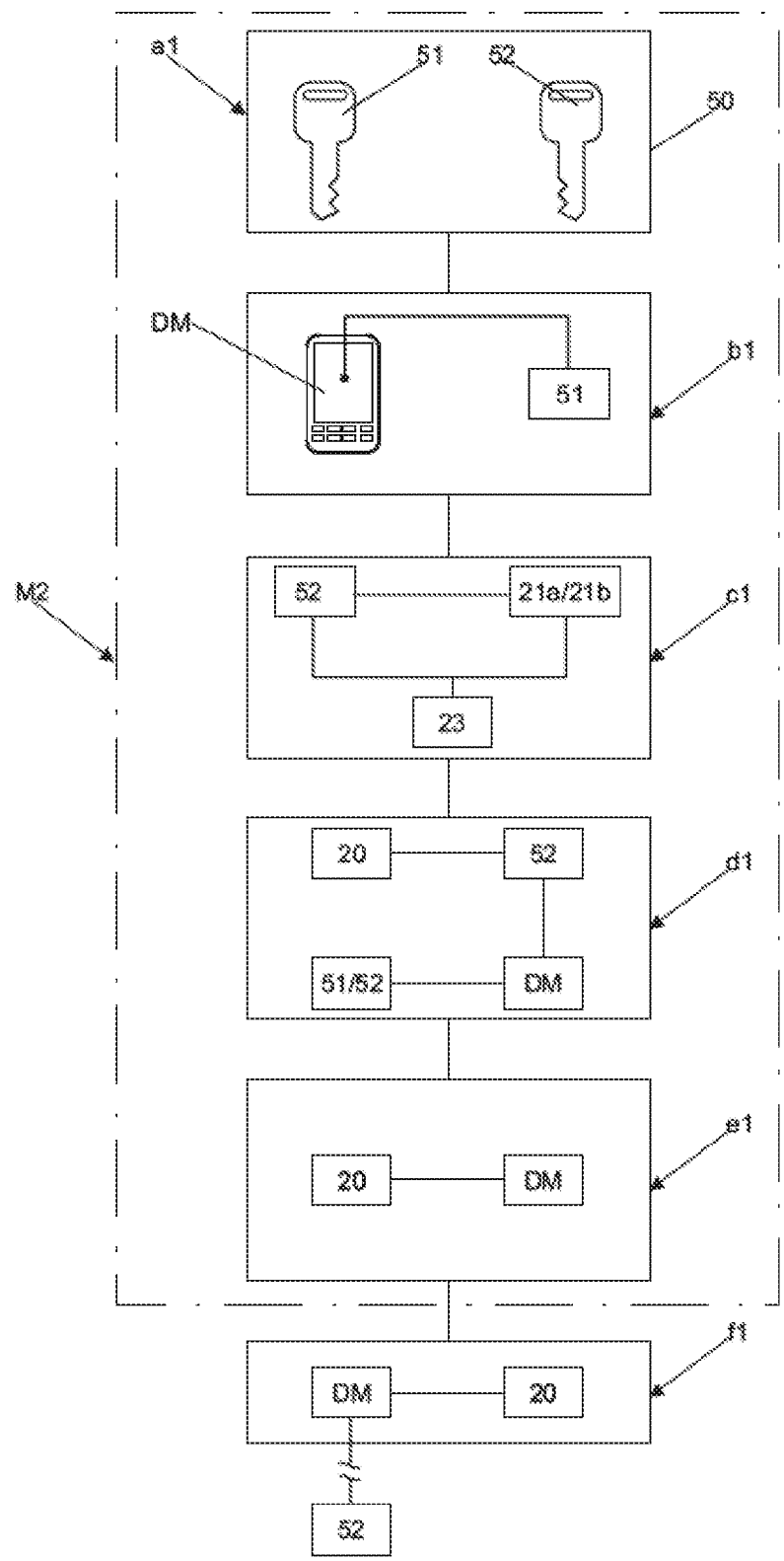
FIGS. 3 and 4 show block diagrams of the logical sequence of the exemplary payer method M2.
Figure 4:
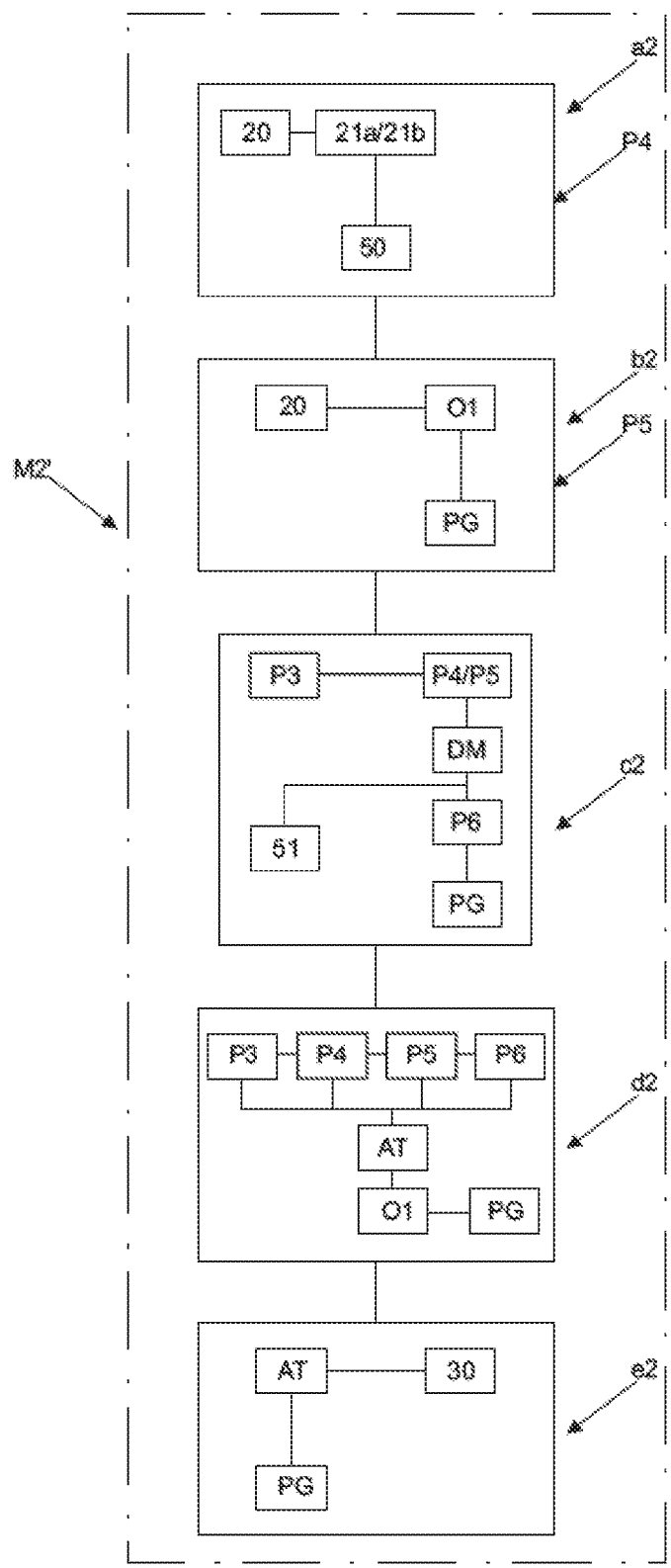
Figure 4A:
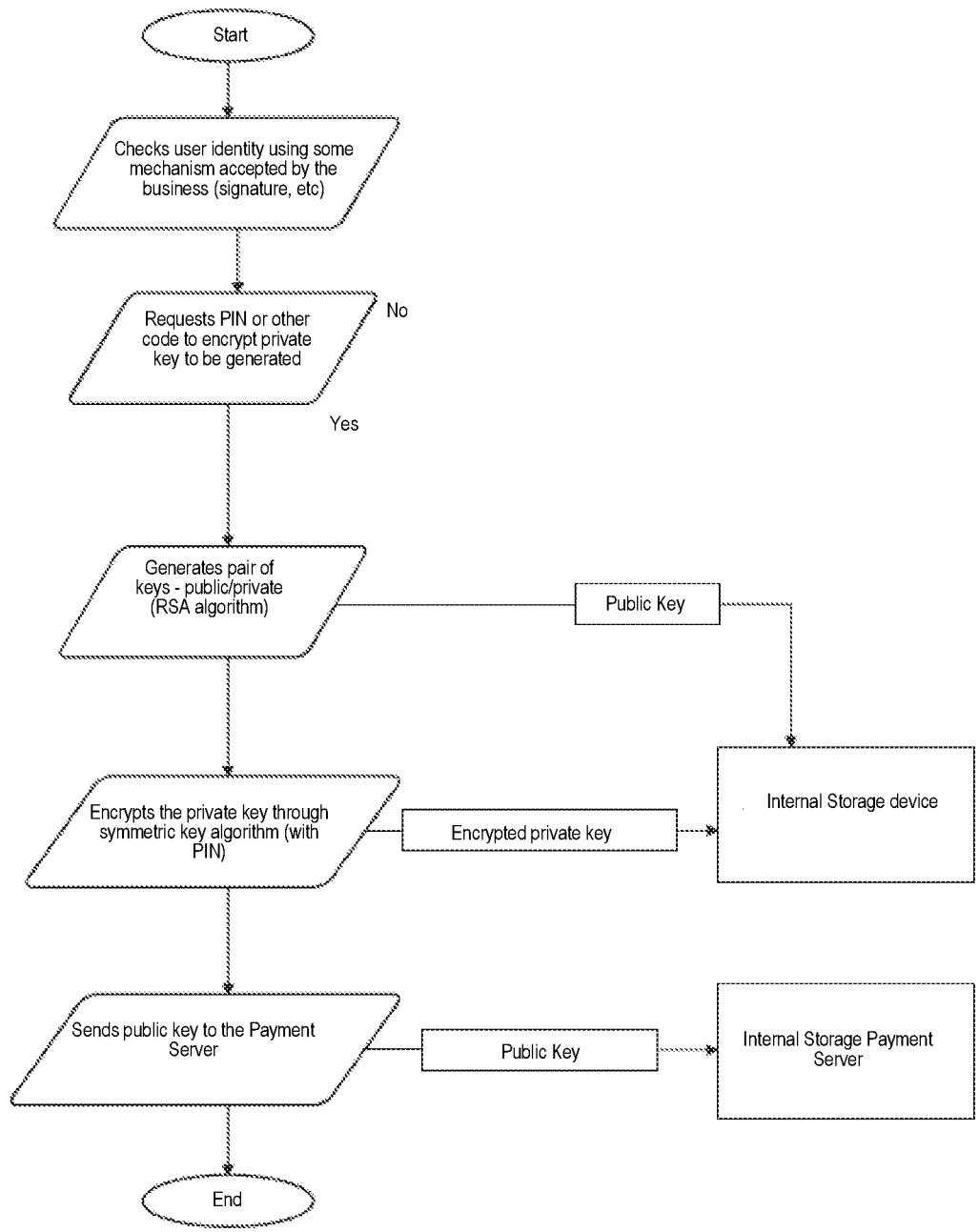
FIG. 4A shows a flowchart for generation of the pair of keys (public and private) associated to the payer and its mobile device.
Figure 5:
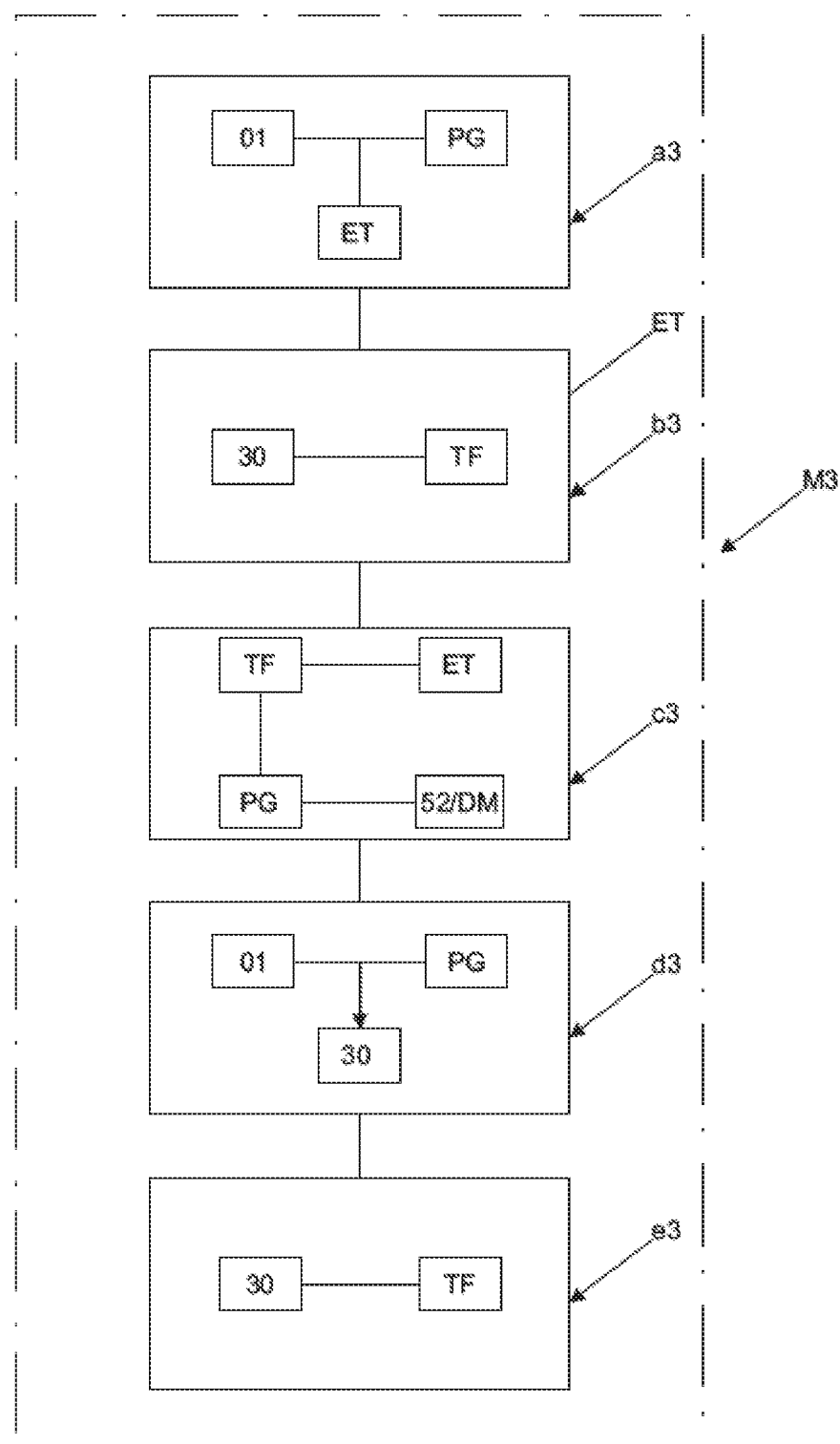
FIG. 5 illustrates a block diagram of the logical sequence of the exemplary offline payment authorization method of the payee M3 and the Authorization Entity (ET).
Figure 5A:
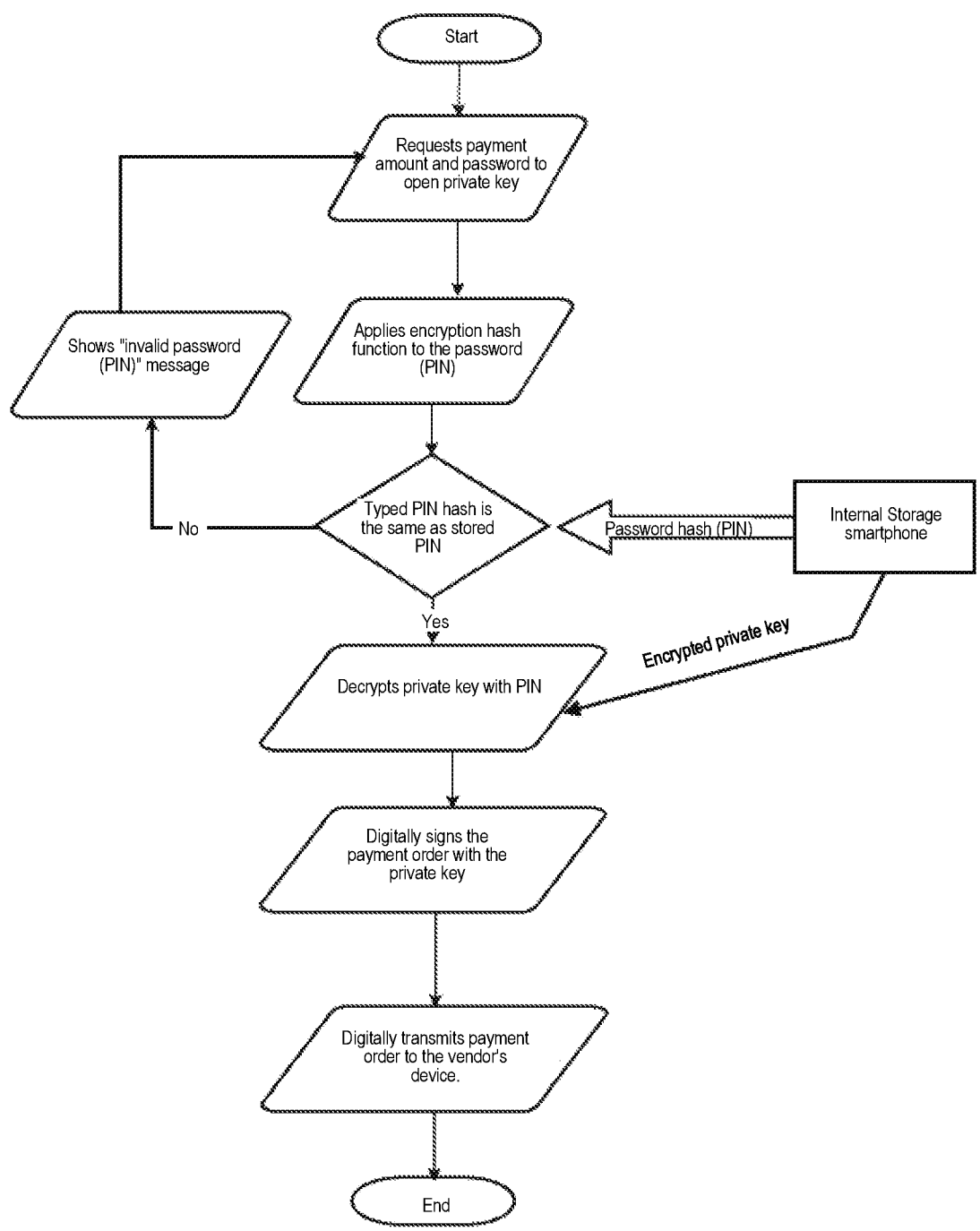
FIG. 5A shows the payment order generation flowchart.
Figure 5B:
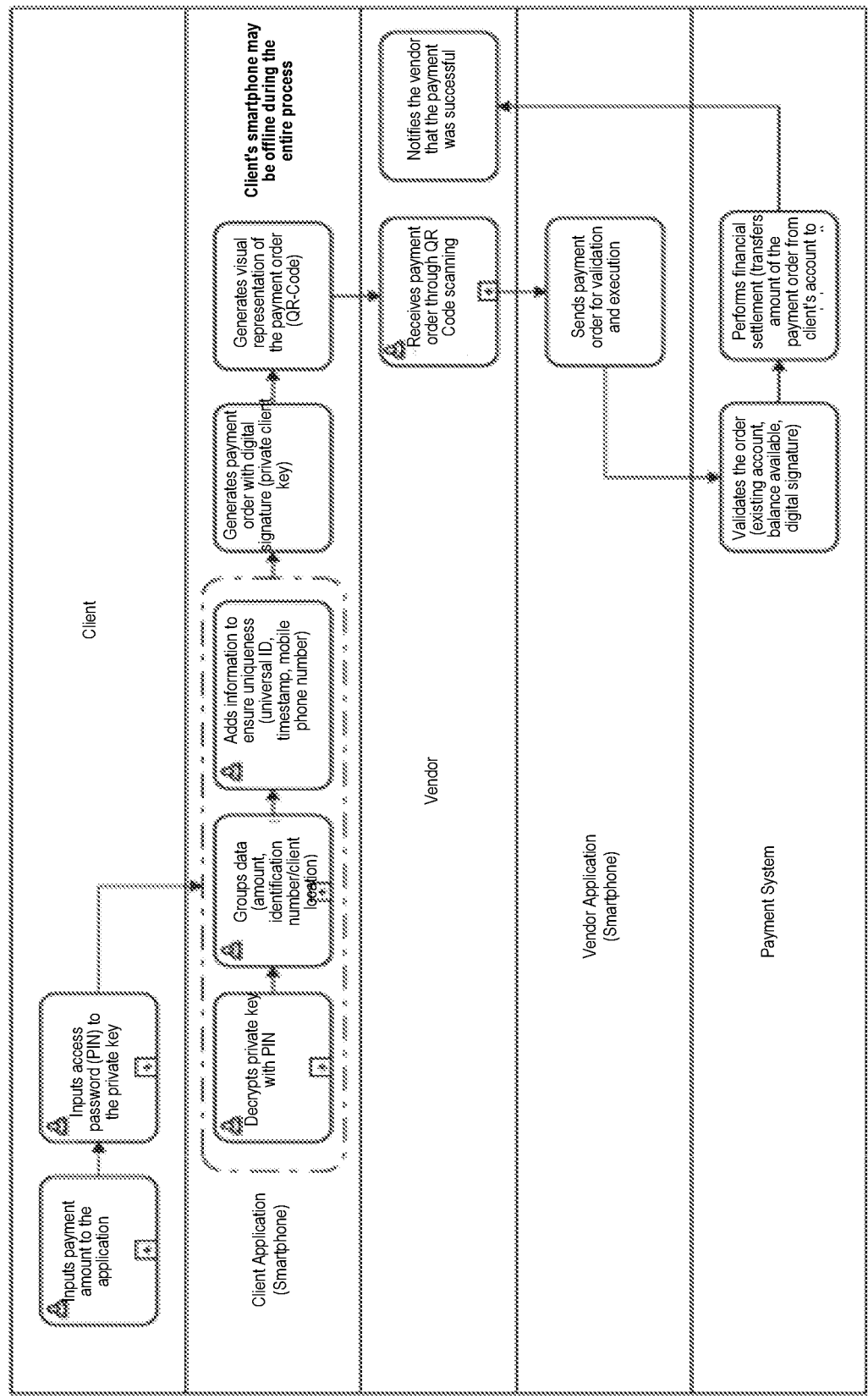
FIG. 5B shows a flowchart of an example of payment authorization.

According to the figures, this invention relates to a "METHOD FOR PAYMENT AUTHORIZATION ON OFFLINE MOBILE DEVICES WITH IRREVERSIBILITY ASSURANCE", more precisely relating to a method for payment authorization (10) on mobile payment devices (DM) such as smartphones, tablets or other devices available which may be offline.

According to this invention, said method for payment authorization (10) is executed, especially, on mobile devices (DM) with enough processing capacity for executing encryption algorithms and which may be used for generating payment orders (PG), on-site or otherwise, using financial resources (RF) or credit limits (LC) such as bonuses, points, products, tickets, etc. of the payer (20) of the device (DM).

Said method for payment authorization (10) comprises the compilation of sequential steps of the method (M1) of the payer (20) with the method (M2) of the operational system (50) or application that form a logical structure for alignment with the method (M3) of the payee (30), resulting in authenticated offline payment (PG) of financial transactions (TF) with "non-repudiation" assurance through generation of a private key (51) and a public key (52), as well as association of positive identification (21a) and personal identification (21b) of the payer (PG) with the mobile device (DM).

In a preferred operational version, the method (M1) of the payer (20) starts with the steps for authorization request (21) for performance of the financial transaction (TF) through identification means (21a) and (21b) and association of the mobile device (DM) with the holder/payer (20) for execution of the financial transaction (TF). The steps (P1) for identification (21a) and (21b) are:

a) Positive identification (21a) and preview of the holder/payer (20) of the device(s) (DM) used to perform the payments (PG). Said positive identification may be executed in many ways, such as digital certificate, on-site validation, notary office, credit bureaus, etc.;

b) Personal identification (21b) of the payer 920) through the respective e-mail, tax identifier as the personal identification number, device (DM) identification, but in case the device is a smartphone, identification is made from the phone number through installation of the application (50) and other devices may have other forms of identification, as well as identification of other complementary information such as payer address;

c) Request for association (21c) of the mobile device (DM) to its identity (21a) and (21b). The payer (20) may prove, optionally, that the holds the device (DM), but in case the device is a smartphone, said proof may be provided, for example, by sending a text message with a random number—code—to the device (DM) and requesting that the payer (20) inputs the code received to the application (50). Other devices may have unique serial numbers and the payer (20) must provide it during this action;

d) Request the payer (20) to provide some sort of payment authorization key (PG), which may be represented by a security code (23)—PIN—, a biometric feature such as fingerprint, iris recognition, face, voice, etc. or any other means.

After identification of the payer (20) the method (M2) of the operational system (50) follows with logical steps for association of the mobile device (DM) with the holder/payer (20) through the following steps (P2):

a1) Generation of a pair of keys (51) and (52) through the application (50), one being a private key (51) and the other a public key (52) by means, for example, an RSA algorithm, or another with n-bits, in which n may be any proper number, such as 1024 or 2048, in order to ensure the security level of the keys (51)/(52), which may vary due to the typical amounts of financial transactions, for example;

b1) The private key (51) is stored in the device (DM) while encrypted through some symmetric encryption mechanism (with the PIN as the key) which only allows recovery with the key defined on step (d);

c1) The public key (52) with identifications (21a) and (21b) of the payer (PG) and device (DM) is sent to a payment authorization server (53) which, in turn, records the association between this device (DM) and the public key

(52) of the holder (20) of the mobile device (DM). To perform this step, the payer's device (DM) must be online;

d1) The holder (20) confirms the public key (52), confirming the device (DM) through respective identifications (51) and (52) or any other entity that may truthfully attest the person who can authorize the payments (PG), in the device (DM). Optionally the holder/payer (20) of the mobile device (DM) can establish use restrictions, such as location, product type and services to be paid, specific times for use, etc.;

e1) After confirmation of the association of the holder/payer (20) and mobile device (DM), it is now registered and authorized to generate payment orders, transfer of financial resources or other similar activities;

f1) For disqualification of the mobile device (DM) as means of payment, the holder/payer (20) can, for example, contact the customer service of the company that authorizes payments and request deactivation of the mobile device (DM). The simple removal of the corresponding public key (52) prevents that payment (PG) orders (O1) signed by the device (DM) are accepted thereafter.

After the identification steps (21a) and (21b) and association of the possession of the mobile device (DM), the authorized holder/payer (20) to use the device (DM) for payments (PG) of various financial transactions (TF) proceeds with the following steps (P3):

i. Communication of the amount (V1) of the transaction (TF);

ii. Optionally, any additional information such as identification of the entity that will validate the payment (PG) order (O1), currency of the payable amount (V1), identification of the financial source in case the payer (20) has more than one current account, credit card, etc.;

iii. Identification of the purchase such as order number, invoice, description, etc.;

iv. Identification of the recipient/payee(s) (30) that are authorized to receive such payment (PG);

v. Information of any other use restriction of the payment (PG) order (O1) such as determination of geographic region, specific purpose or any other restriction;

vi. Validity of the payment (PG) order (O1);

vii. Code(s) of the goods being traded;

viii. Necessary information for access to the private key (51), in other words, PIN, biometry, etc.

After obtaining information of the steps (P3) the method (M2) of the operational system (50) proceeds with the second sequence of logic steps, which are:

a2) Grouping (P4), necessarily, with the identifications (21a)/(21b) of the payer (20) which issues the authorization, in other words, account number, fiscal identifier or any other identification form of the payer (20) to the system (50);

b2) Grouping (P5) with information provided by the payer (20) and some information that ensure uniqueness of this payment (PG) order (O1), for example: i) identification of the payee's account; ii) universal identifier—UUID—of the payment; iii) mobile device identifier (DM); iv) timestamp such as date/time at the moment of generation of the authorization;

v) a combination of this information; vi) other that may be applicable;

c2) From the information of the step (P3) and grouping (P4) and (P5), the device (DM) generates a payment (PG) authorization (P6), such as a byte sequence that provides the payment data (PG), additionally with a digital signature using the private key (51) of the holder/payer (20) of the mobile device (DM), through any common algorithm for this purpose such as SHA+RSA, MD5+RSA, etc.;

d2) All data mentioned in steps (P3), (P4) and (P5), with the digital signature generated in step (P6) constitute the authorization (AT) of the payment (PG) order (O1);

e2) The authorization (AT) generated in the previous step (d) is then transferred to the payee (30) of the payment (PG), either through a bar code, visual signals, electromagnetic waves, sound waves, etc.

The Method (M3) of the payee (30), after receiving the payment (PG) order (O1), proceeds with the following steps:

a3) Sending of the payment (PG) order (O1) to the entity (ET) that authorizes and settles the payment (PG), with said entity (ET) typically being a bank, payment institution, credit company or similar;

b3) Said entity (ET) verifies if the authorization is valid, analyzing all pertaining restrictions, such as location, spending limits, balance available, existing account, etc. For such, the payee's device (30) needs an online mechanism for communication between the payee's device (30) and the entity (ET) that authorizes it, or any kind of trust bond between the payer (20) and the payee (30), so that the recipient may act on behalf of the entity (ET), even when offline. In this last case, the payee takes the risk that the payment order may not be authorized afterwards by the (ET);

c3) After the information of the financial transaction (TF) is validated, the authorizing entity (ET) checks the authenticity of the digital signature, comparing the payment (PG) information with the public key (52) previously registered for the device during step (e) of the method (M2) of the operational system (50). The validation of the signature ensures that such order (O1) is indeed generated by the device (DM) authorized and signed with the private key (51) of the holder/payer (20) and, therefore, free of tampering prior to reaching the ET;

d3) After validation of the steps (b) and (c), the payment (PG) order (O1) is processed, transferring funds from the payer's (20) account to the payee's (30) account or generating any effect needed for such payment order (PG) to be processed, which may not necessarily involve money, but also credit from reward programs, shopping vouchers, etc.;

e3) Afterwards the payee's device (30) is notified about the transaction taking place, which is then concluded and recorded.

It should be noted, then, that the technical evolution of this invention lies in the methods (M1), (M2) and (M3) herein featuring the ability of the authorization server in authorizing a payment (PG) order (O1) generated by the mobile device (DM) of the payer (20) without any connection between the payer (20) and the authorization server, enabling the payer (20) to be completely offline, with only a screen to show a bar code, a speaker for producing sounds, an NFC or any other means for sending a small amount of data to the sales device (DM) of the vendor (30) in an unidirectional manner.

Another relevant aspect of this invention is the combination of various encryption techniques and digital signature for generating a digital representation capable of ensuring authenticity of its information (payer, amount and other additional information).

Another relevant aspect refers to the optimization of the implementation of encryption algorithms, digital signature and generation of the digital code so that the processing requisites are compatible with the capacity of most current mobile devices (CPU, memory, screen resolution).

Aside from the optimization related to the implementation of the aforementioned algorithms, optimization of the digital representation may also be mentioned, regarding the amount of bits needed to store all information of the payment order.

It is certain that when this invention is put into practice, modifications may be introduced concerning certain construction and shaping details, without departing from the base principles that are clearly substantiated in the set of claims, therefore considering that the terminology used is not limiting in any sense.

The invention claimed is:

1. A method for using a mobile device to implement offline payment authorization for financial transactions with non-repudiation assurance, said method comprising:
receiving, at a payer mobile device, an indication of a positive identification of the payer mobile device for a user of the payer mobile device and a personal identifier for the user of the payer mobile device;
generating, at the payer mobile device, a first association between the indication of the positive identification of the payer mobile device and the personal identifier for the user that indicates the payer mobile device is authorized to generate payment orders for the user;
receiving, at the payer mobile device, an authentication credential from the user to be used for payment authorization;
generating, at the payer mobile device, an asymmetric key pair having a private key and a public key for use in signing and verifying payment orders generated for the user;
storing the private key in a data store of the payer mobile device and restricting access to the private key with the authentication credential;
transmitting the public key and the first association from the payer mobile device to a payment authorization server system; and
recording a second association between the public key and the first association at the payment authorization server system;
wherein in response to receiving, at a payee data transfer device, a payment order for a transaction for the user that is signed with a digital signature using the private key, transmitting the payment order from the payee data transfer device to the payment authorization server system;
verifying authenticity and integrity of the payment order by using the public key to validate the digital signature at the payment authorization server system; and
upon verification of the payment order, processing the transaction for the user at the payment authorization server system, wherein the payment order is generated at the payer mobile device, being offline and disconnected from a payment authorization network, and transferred to the payee data transfer device from the payer mobile device without utilizing an online connection between the payee data transfer device and the payer mobile device
wherein upon verifying the second association, the payment authorization server system registers an indication that the payer mobile device is authorized to generate payment orders for the user;
wherein the payment authorization server system is operable to associate use restrictions for payment orders defined by the user with the indication that the payer mobile device is authorized to generate payment orders for the user;
wherein the payment authorization server system is operable to, in response to a deactivation request from the user, delete the recording of the public key to prevent processing of payment orders generated for the user by the payer mobile device;
wherein generating the payment order for the transaction at the payer mobile device comprises:
receiving information input by the user for the transaction indicating a payable amount for the transaction, the payment authorization server system;
and providing:
a currency or type for the payable amount;
a payment source for the user from which the payable amount is to be drawn;
an identification of a purchase for which the payment order is being made;
an identification of a payee for the transaction, any use restrictions specific to the payment order, validity of the payment order, one or more codes for each item or service being purchased, and/or other access credentials; and
wherein generating the payment order for the transaction at the payer mobile device further comprises:
preparing a grouping of data that includes the first association, unique identification information for the payment order, and an appropriate set of the information input by the user for the transaction to the payer mobile device;
utilizing the authentication credential included in the information input by the user for the transaction to access the private key; and using the private key to create a digital signature for the grouping of data;
wherein the payment order is transferred to the payee data transfer device from the payer mobile device as the grouping of data signed with the digital signature in an offline manner; and
wherein the unique identification information for the payment order includes at least one of an identification of an account for the payee, a universal identifier for the payment, a mobile device identifier, and a timestamp for generation of the payment order.

2. The method of claim 1, wherein generating the asymmetric key pair, storing the private key in the data store of the payer mobile device, restricting access to the private key with the authentication credential, and transmitting the public key and the first association to the payment authorization server system are performed by the payer mobile device in response to generation of the first association.

3. The method of claim 1, wherein verifying the payment order at the payment authorization server system further comprises the payment authorization server system, upon receiving the payment order from the payee data transfer device, validating the transaction first by verifying the integrity of the payment order digital signature using the associated public key and then by confirming that each use restriction associated with the indication that the payer mobile device is authorized to generate payment orders for the user and each use restriction specific to the payment order that is indicated within the grouping of data is satisfied and confirming that the payment source indicated within the grouping of data has a sufficient available balance to cover the payable amount for the transaction indicated within the grouping of data;
wherein the currency or type for the payable amount indicated within the grouping of data specifies that the payable amount for the transaction is selected from the group consisting of a monetary value, reward program points, a voucher, a bonus, a product, and a ticket;

wherein if the currency or type for the payable amount specifies that the payable amount for the transaction is a monetary value, processing the transaction for the user comprises transferring the payable amount from the payment source to an account for the payee.

4. The method of claim 3, wherein each of one or more of the use restrictions specifies one of a location from which the payment order is received, a type of product for the purchase for which the payment order is being made, a type of service for the purchase for which the payment order is being made, and a time period during which the payment order is received that must be satisfied for the payment authorization server system to process the transaction for the user.

5. The method of claim 4, wherein the payment order is transferred to the payee data transfer device from the payer mobile device using a medium selected from the group consisting of a 1D or 2D bar code, visual signals, near-field communication, and sound waves.

* * * * *